(12) United States Patent
Hallundbæk

(10) Patent No.: US 11,220,209 B2
(45) Date of Patent: Jan. 11, 2022

(54) BUS WITH A SAFETY LIGHTING SYSTEM FOR ROAD USERS

(71) Applicant: Alpha EC Industries 2018 S.à.r.l., Luxembourg (LU)

(72) Inventor: Jørgen Hallundbæk, Luxembourg (LU)

(73) Assignee: ALPHA EC INDUSTRIES 2018 S.A.R.L., Luxembourg (LU)

( * ) Notice: Subject to any disclaimer, the term of this patent is extended or adjusted under 35 U.S.C. 154(b) by 0 days.

(21) Appl. No.: 16/874,726

(22) Filed: May 15, 2020

(65) Prior Publication Data

US 2020/0361371 A1    Nov. 19, 2020

(51) Int. Cl.
*B60Q 1/00* (2006.01)
*B60Q 1/52* (2006.01)
*B60Q 1/24* (2006.01)
*B60Q 1/46* (2006.01)

(52) U.S. Cl.
CPC ............... *B60Q 1/525* (2013.01); *B60Q 1/24* (2013.01); *B60Q 1/46* (2013.01)

(58) Field of Classification Search
CPC .................................................. G08B 25/016
USPC .......... 340/435, 436, 438, 539.12, 540, 541, 340/903, 905; 701/301
See application file for complete search history.

(56) References Cited

U.S. PATENT DOCUMENTS

| | | | |
|---|---|---|---|
| 9,604,573 B2* | 3/2017 | Shimizu | G08G 1/166 |
| 9,896,020 B2 | 2/2018 | Dellock et al. | |
| 9,902,315 B2 | 2/2018 | Salter et al. | |
| 11,010,622 B2* | 5/2021 | Naser | G06K 9/00805 |
| 2012/0303458 A1 | 11/2012 | Schuler, Jr. | |
| 2015/0043231 A1 | 2/2015 | Clark | |
| 2016/0167648 A1 | 6/2016 | James et al. | |
| 2017/0101056 A1* | 4/2017 | Park | B60R 1/00 |
| 2017/0355306 A1 | 12/2017 | Bellotti et al. | |
| 2018/0079359 A1 | 3/2018 | Park et al. | |
| 2018/0238516 A1 | 8/2018 | Fogg et al. | |

FOREIGN PATENT DOCUMENTS

| | | |
|---|---|---|
| CN | 104827979 A | 8/2015 |
| CN | 205344659 U | 6/2016 |
| DE | 102014211530 A1 | 12/2015 |

(Continued)

OTHER PUBLICATIONS

Luxembourg Search Report and Written Opinion, LU 101213, dated Jan. 23, 2020, 8 pages.

*Primary Examiner* — Tai T Nguyen
(74) *Attorney, Agent, or Firm* — Rankin, Hill & Clark LLP

(57) ABSTRACT

A vehicle, such as an articulated bus, includes a lighting system with a light emitting surface. The lighting system being configured for displaying a first lighting configuration and a second lighting configuration. The first lighting configuration and the second lighting configuration are displayed by different proportions of the light emitting surface. The vehicle further receives a monitoring device with a position monitoring module configured for monitoring the position of a road user with respect to the vehicle. The lighting system being further configured for switching from the first lighting configuration to the second lighting configuration depending on the position of the road user with respect to the vehicle. A corresponding monitoring process is further provided.

18 Claims, 10 Drawing Sheets

(56) References Cited

FOREIGN PATENT DOCUMENTS

| | | |
|---|---|---|
| DE | 202016103822 U1 | 9/2016 |
| DE | 102015109932 A1 | 12/2016 |
| DE | 102017008612 A1 | 3/2018 |
| EP | 3216653 A1 | 9/2017 |
| EP | 3369616 A1 | 9/2018 |
| JP | 2015-116983 A | 6/2015 |
| JP | 2015-141881 A | 8/2015 |
| KR | 10-2012-0112003 A | 10/2012 |
| KR | 10-2016-0131197 A | 11/2016 |
| SE | 1751172 A1 | 7/2018 |
| WO | 2007/110654 A1 | 10/2007 |
| WO | 2008/157618 A2 | 12/2008 |
| WO | 2016/014966 A2 | 1/2016 |
| WO | 2017/138146 A1 | 8/2017 |
| WO | 2017/180900 A1 | 10/2017 |
| WO | 2019/048183 A1 | 3/2019 |

\* cited by examiner

BUS WITH A SAFETY LIGHTING SYSTEM FOR ROAD USERS

TECHNICAL FIELD

The invention lies in the field of vehicle safety. More precisely, the invention relates to a vehicle with a display providing signals to a road user in the vehicle environment. The invention also provides a monitoring process, and an associated computer program.

BACKGROUND OF THE INVENTION

Dense circulation in cities remains hazardous for people such as pedestrians and cyclists. Indeed, pedestrians and cyclists need to cross roads between vehicles when the latter stop. However, each vehicle may hide a danger such as another vehicle driving in the opposite lane. If people do not check if any other vehicle is arriving, an accident may occur. Children leaving a school bus are peculiarly exposed.

Vehicle may be dotted with lighting systems warning pedestrians that a dangerous situation is arising. Specific lights are provided. However, these lights involve an important power consumption. In addition, pedestrian may fail to perceive the warning message, notably when they are focused on said vehicle, or on another feature around. Moreover, the environment next to the vehicle may enclose masks hiding lights, rendering warning signals useless.

The document SE1751172 A1 discloses a method and a system for facilitating safety for road users in association with an autonomous vehicle. A display provides two pictures which correspond to two different road users. Real time movements, such as arm movements, are displayed in real time.

The document DE 10 2017 008 612 A1 discloses a method and a system for conveying the safety vulnerable road users in connection with a vehicle.

The document WO 2017/138 146 A1 discloses an information display device and an information display method.

The document DE 10 2015 109 932 A1 discloses a warning device for a motor vehicle with an externally arranged display device and a motor vehicle.

Technical Problem to be Solved

It is an objective of the invention to present a vehicle, which overcomes at least some of the disadvantages of the prior art. In particular, it is an objective of the invention to present a vehicle which increase safety.

SUMMARY OF THE INVENTION

According to a first aspect of the invention to provide vehicle, notably a bus, said vehicle comprising: a lighting system with a light emitting surface, said lighting system being configured for displaying a first lighting configuration and a second lighting configuration, the second lighting configuration being displayed by a proportion of the light emitting surface, a position monitoring module configured for monitoring the position of a road user with respect to said vehicle; the lighting system being further configured for switching from the first lighting configuration to the second lighting configuration depending on the position of the road user with respect to the vehicle.

Preferably, the lighting system is further configured for switching from the first lighting configuration to the second lighting configuration when the position monitoring module detects that the road user moves from a first predefined area to a second predefined area, the first predefined area corresponding to a first side of the vehicle or a first face of the vehicle, and the second predefined area corresponding to a second side of the vehicle or a second face of the vehicle.

Preferably, the first lighting configuration comprises a first luminous picture, and/or the second lighting configuration comprises a second luminous picture.

Preferably, the first luminous picture is vertically taller and/or horizontally larger than the second luminous picture, the area of the second luminous picture being smaller than the area of the first luminous picture.

Preferably, the first luminous picture is at distance from the second luminous picture, or the first luminous picture overlaps at least partially the second luminous picture.

Preferably, the first lighting configuration comprises a first outline and the second lighting configuration comprises a second outline with a different shape than the first outline, the second outline defining more angles than the first outline.

Preferably, the first lighting configuration comprises a first highest point, and the second lighting configuration comprises a second highest point which is below the first highest point.

Preferably, the first lighting configuration and/or the second lighting configuration extends on the majority of the vehicle width, or substantially the whole vehicle width.

Preferably, the lighting system is further configured such that when the road user is at a first distance from the vehicle the lighting system displays the first lighting configuration with a first portion of the light emitting surface; and when the road user is at a second distance from the vehicle, the lighting system displays the second lighting configuration with a second portion of the light emitting surface, the first distance being larger than the second distance, and the second portion being smaller than the first portion.

Preferably, the vehicle comprises a bumper, the lighting system being vertically at distance from said bumper, the vehicle comprising a vertical separation between the bumper and the light emitting surface; or the light emitting surface vertically extends from the bumper.

Preferably, the second lighting configuration, notably the second luminous picture, is vertically at distance from the bumper.

Preferably, the minimum distance between the second luminous picture and the bumper is larger than the minimum distance between the bumper and the second luminous picture.

Preferably, the bumper is longitudinally offset with respect to the light emitting surface.

Preferably, the lighting system comprises a matrix of light emitting diodes which is configured for displaying the first lighting configuration and the second lighting configuration, said matrix of light emitting diodes notably comprising a transparency of at least 40%, or comprised between 40% and 90%, or 40% and 80%, and the vehicle comprises a transparent window, the lighting system covering said transparent window.

Preferably, the vehicle comprises a rear face and a side face, the lighting system extending on the rear face and on the side face, the lighting system is further configured such that the first lighting configuration is displayed from the side face; and the second lighting configuration is displayed from the rear face.

Preferably, the monitoring device comprises at least one camera adapted for detecting a dangerous event, the lighting system being configured for switching from the first lighting configuration to the second lighting configuration upon detection of a dangerous event.

Preferably, the first lighting configuration comprises a first level of safety for the road user, and the second lighting configuration comprises a second level of safety for the road user, said second level being higher than the first level, the second safety level comprising a frequency increase, a middle point elevation, a light intensity increase, with respect to the first level of safety.

Preferably, the vehicle comprises a monitoring device from which the position monitoring module is part.

Preferably, the first lighting configuration and the second lighting configuration are selectively or simultaneously displayed.

Preferably, the first luminous picture and/or the second luminous picture, is displayed in the field of visible light, and/or with a light comprising a frequency ranging from 400 THz to 770 THz.

Preferably, the first lighting configuration and the second lighting configuration are displayed by different numbers of LEDs.

Preferably, the first area and the second area are adjacent.

Preferably, the first area and the second area are part of the vehicle environment.

Preferably, the first lighting configuration is displayed by a first percentage of the light emitting surface, and the second lighting configuration is displayed by a second percentage of the light emitting surface which is different, notably smaller, than the first percentage.

Preferably, the monitoring device is configured for defining a virtual fence which is fixed with respect to said vehicle, the lighting system being configured for switching from the first lighting configuration to the second lighting configuration when the road user crosses the virtual fence.

Preferably, the vehicle comprises a passenger compartment with a transversal width, the screen display extending on the whole transversal width of the passenger compartment.

Preferably, the first lighting configuration comprises a first safety signal, and/or the second lighting configuration comprises a second safety signal.

Preferably, the lighting system comprises a screen display which is configured for displaying the first lighting configuration and the second lighting configuration.

Preferably, the first lighting configuration and the second lighting configuration comprise different wavelengths, and/or different powers, and/or different lighting intensities.

Preferably, the second lighting configuration comprises a greater luminous intensity than the first lighting configuration, the luminous intensities possibly being average luminous intensities.

Preferably, the lighting system extends on the majority, or substantially the whole width, of the vehicle.

Preferably, the road user is a pedestrian or a driver of another vehicle.

Preferably, the second luminous picture comprises, at least partially, the first luminous picture.

Preferably, the monitoring device is further configured for identifying a mask, notably another vehicle, between said vehicle and the road user, the lighting system is further configured for switching from the first lighting configuration to the second lighting configuration when the mask masks the first lighting configuration to the road user, the second lighting configuration being configured such that the second lighting configuration is in the field of view of the road user.

Preferably, the area of the second luminous picture represent at most 50%, or 20%, or 10% of the light emitting surface.

Preferably, the area of the first luminous picture represent at most 50%, or 20%, or 10% of the light emitting surface.

Preferably, the light emitting surface is continuous and/or homogeneous.

It is another aspect of the invention to provide a monitoring process of a lighting system for a vehicle which comprises a lighting system with a light emitting surface, said lighting system being configured for displaying a first lighting configuration and a second lighting configuration, the monitoring process comprising the steps: displaying the first lighting configuration with, at least a first proportion of, the light emitting surface, monitoring the vehicle environment in order to detect a road user, notably a pedestrian or a driver, and in order to determine the position of said road user notably with respect to the vehicle or the environment of said vehicle, detecting a position change of the road user, notably in front of the lighting system, then displaying the second lighting configuration with a second proportion of the light emitting surface; the vehicle being notably in accordance with the invention.

Preferably, the lighting system comprises a communication module adapted to communicate with the environment, notably with a road infrastructure and/or at least another vehicle, the lighting system switching from the first lighting configuration to the second lighting configuration depending on data received from the environment.

Preferably, the monitoring process further comprises a step identifying a mask such as a car, between said vehicle and the road user, the monitoring process starting step displaying the second lighting configuration upon detection of a mask between said vehicle and the road user, said second lighting configuration comprising an offset portion with respect to the mask.

Preferably, step detecting a position change of the road user comprises a step detecting a speed change of the road user.

Preferably, step detecting a position change of the road user is a position change of the road user with respect to the vehicle.

Preferably, at step detecting, the road user and/or the mask moves faster than said vehicle.

Step detecting a position change is not an essential aspect of the invention. It is another aspect of the invention to provide a monitoring process of a lighting system for a vehicle which comprises a lighting system with a light emitting surface, said lighting system being configured for displaying a first lighting configuration and a second lighting configuration; the monitoring process comprising the steps: monitoring the vehicle environment in order to detect a road user, notably a pedestrian or a driver, and in order to determine the position of said road user with respect to the vehicle; displaying the first lighting configuration with a first percentage of the light emitting surface; identifying a mask such as a car, between said vehicle and the road user; then displaying the second lighting configuration with a second percentage of the light emitting surface which is different from the first percentage, said second lighting configuration notably comprising an offset portion with respect to the mask; the vehicle being notably in accordance with the invention.

It is a further aspect of the invention to provide a computer program comprising computer readable code means, which when run on a computer, cause the computer to run the monitoring process in accordance with the invention, preferably at step detecting, the road user and/or the mask moves faster than said vehicle.

It is a further aspect of the invention to provide a computer program product including a computer readable medium on which the computer program in accordance with the invention.

It is a further aspect of the invention to provide a computer configured for carrying out the monitoring process in accordance with the invention.

The different aspects of the invention may be combined to each other. In addition, the preferable features of each aspect of the invention may be combined with the other aspects of the invention, unless the contrary is explicitly mentioned.

Technical Advantages of the Invention

The invention improves the safety for the road user outside the vehicle. Indeed, a specific lighting configuration is provided to his attention. In addition, the invention reduces power consumption since a tailored luminous signal is sent toward the road user in case of danger. The dedicated lighting configuration may be centred on the road user in order to catch his attention in a more direct way.

In addition, the invention also considers situations where masks may come between the road user and the safety vehicle which displays the two specific lighting configurations. Generally speaking, the lighting system may use portions of the lighting surface which are not hidden by the mask. Accordingly, only a visible portion of said lighting surface is used when necessary.

BRIEF DESCRIPTION OF THE DRAWINGS

Several embodiments of the present invention are illustrated by way of figures, which do not limit the scope of the invention, wherein FIG. 1 provides a schematic illustration of a side view of a vehicle in accordance with a preferred embodiment of the invention.

DETAILED DESCRIPTION OF THE INVENTION

This section describes the invention in further detail based on preferred embodiments and on the figures. Similar reference numbers will be used to describe similar or the same concepts throughout different embodiments of the invention. For example, reference 2 denotes different embodiments of the vehicle in accordance with the invention.

It should be noted that features described for a specific embodiment described herein may be combined with the features of other embodiments unless the contrary is explicitly mentioned. Features commonly known in the art will not be explicitly mentioned for the sake of focusing on the features that are specific to the invention. For example, the vehicle in accordance with the invention is evidently driven by an engine, even though such engine is not explicitly referenced on the figures nor referenced in the description.

By convention, it may be defined that the word "longitudinal" refers to the longitudinal direction and may correspond to the main driving direction of the bus. It may be along the main central axis of the vehicle. The word "transversal" refers to the transversal direction and may be perpendicular to the longitudinal direction. The words "rear" and "front" are in relation with the main or actual driving direction of the bus.

In the current invention, the light comprises the light visible by a human being.

Figure 1:
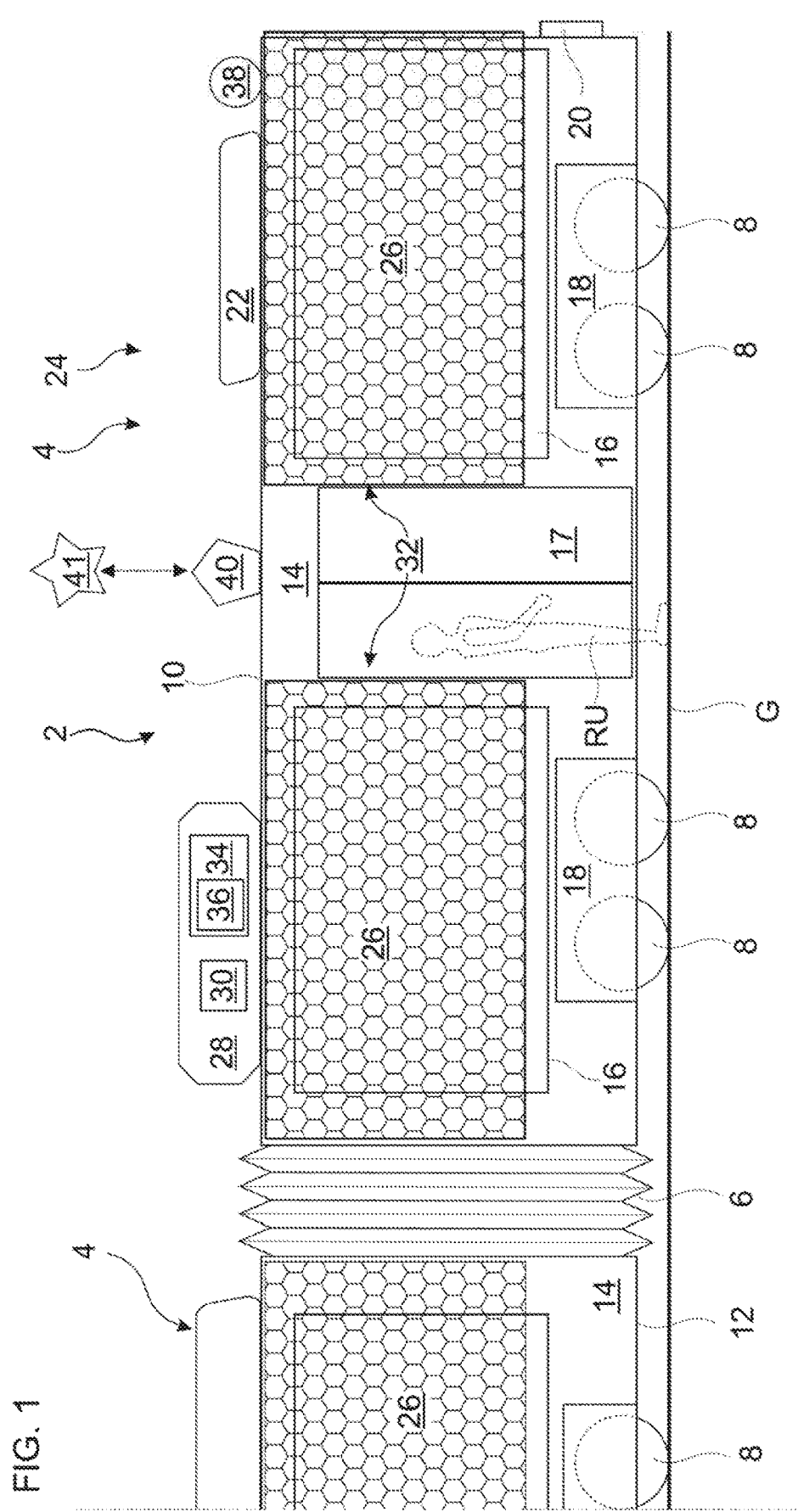

FIG. 1 shows a vehicle 2 for mass transportation in accordance with a preferred embodiment of the invention. The vehicle 2 is partially represented.

The vehicle 2 is adapted for transportation of passengers in cities and may transport about one hundred passengers, for instance one hundred and twenty passengers. The vehicle 2 may be a bus 2, notably an electric bus 2. The bus 2 may include electric driving engines and electric batteries (not represented) powering the electric driving engines. The bus 2 may be purely electric, in the meaning that it is free of combustion engine.

The bus 2 may be an articulated bus. It may comprise a first unit 4 and a second unit 4 (partially represented). Each unit 4, or cart, may form a body in the meaning of a rigid element. Each unit 4 may be a trailer and/or a tractor. The units 4 may be similar or identical. These units 4 may be joined by a connection, for instance a hinged connection 6 enabling the units 4 to swivel with respect to each other.

In the current embodiment, only two units 4 are represented, however it is contemplated in the current invention that the bus 2 includes three, four, or more units 4; which are articulated with respect to its neighbours by hinged connection(s) 6. Then, the passenger capacity may be of more than two hundred. Each unit 4 may be self-supporting. Thus, each unit 4 may move without the hinged connection 6.

A bus formed of a single unit is also considered in the current invention.

Each unit 4 may include several wheels 8 engaging the ground G. Pairs of symmetric wheels 8 may form axles, for instance four axles for each unit 4. The axles and thus the wheels 8 may be distributed along the length of the bus 2. At least one pair of wheels is formed of steered wheels.

Optionally, each wheel 8 of the bus 2 or of at least one unit 4 are steered wheels and/or driving wheels. The roof 10 may support an air conditioning system, and another equipment 22 as well. The bus 2 may include a roof 10, and/or a passenger platform 12, and/or side walls 14. The side walls 14 may be outer walls. Two transversally opposite side walls 14 may go down from the roof 10 to the passenger platform 12. The side walls 14 may receive windows 16 and doors 17 for passengers. Optionally, doors 17 are arranged in one of the two side walls 14, notably between windows 16. For instance; the side walls 14 may close the wheel housings 18.

Optionally, at least one or each wheel housing 18 may receive two longitudinally spaced wheels 8.

The bus 2 may comprise at least one bumper 20, notably a rear bumper and a front bumper. Each bumper 20 may be adapted for absorbing a shock from another vehicle without damaging the whole structure of the bus 2. At least one or each bumper 20 may protrude from the corresponding face, notably from the front end or the rear end respectively. It may be longitudinally offset with respect to the light emitting surface 26.

The bus 2 may be comprise a lighting system 24 with a light emitting surface 26. The lighting system 24 is adapted for displaying a first lighting configuration and a second lighting configuration. The first lighting configuration and the second lighting configuration may be displayed by different proportions, or different percentages, of the light emitting surface 26.

The bus 2 may further comprise a monitoring device 28. The monitoring device 28 may comprise a position monitoring module 30 configured for monitoring the position of a road user RU around the bus 2. The position monitoring module 30 may be adapted for calculating the position of the road user RU with respect to the environment in which the bus moves, and/or with respect to the bus 2. The lighting system 24 may be configured for switching from the first lighting configuration to the second lighting configuration depending on the position of the road user with respect to the bus 2. The lighting system 24 may be at distance from each bumper 20, notably vertically at distance from the or each bumper 20.

The light emitting surface 26 may be formed by at least one, or several screens. The light emitting surface 26 may be formed by at least one, or several matrices 32 of Light Emitting Diodes (LED).

The diodes (not represented) forming at least one of the matrices 32 may have a pitch of about 20 mm. It may be understood that the diodes form a meshing with square meshes of about 20 mm. Triangular meshes or other shapes are considered as well.

The matrices 32 may be disposed at distance from the doors 17. The matrices 32 may cover the windows 16. Since the windows 16 are transparent, the light emitting surface 26 and notably the matrices 32 may be transparent. For instance, at least one or each matrix 32 may exhibit a transparency of at least 40%. A transparency of at least 40% may be understood as allowing a light passage of at least 40% through said matrix 32.

The bus 2 may comprise a computer 34. The computer 34 may comprise a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30.

Camera 38 may be used in order to monitor the position of road users RU. As an alternative or in addition, communication means 40 may be used in order to obtain data from outer monitoring system 41 providing information on position of road users RU. A road user may be detected by a wearable device such as a cellular phone (not represented). A WIFI communication may be involved.

The position monitoring module 30 may be adapted for calculating the position of several road users RU (only one represented) simultaneously. The lighting system 24 may adapt the first and second lighting configuration to these road users RU by displaying, at least in the second lighting configuration, several portions. For instance, each of these portions may be dedicated to an associated road user.

Figure 2:
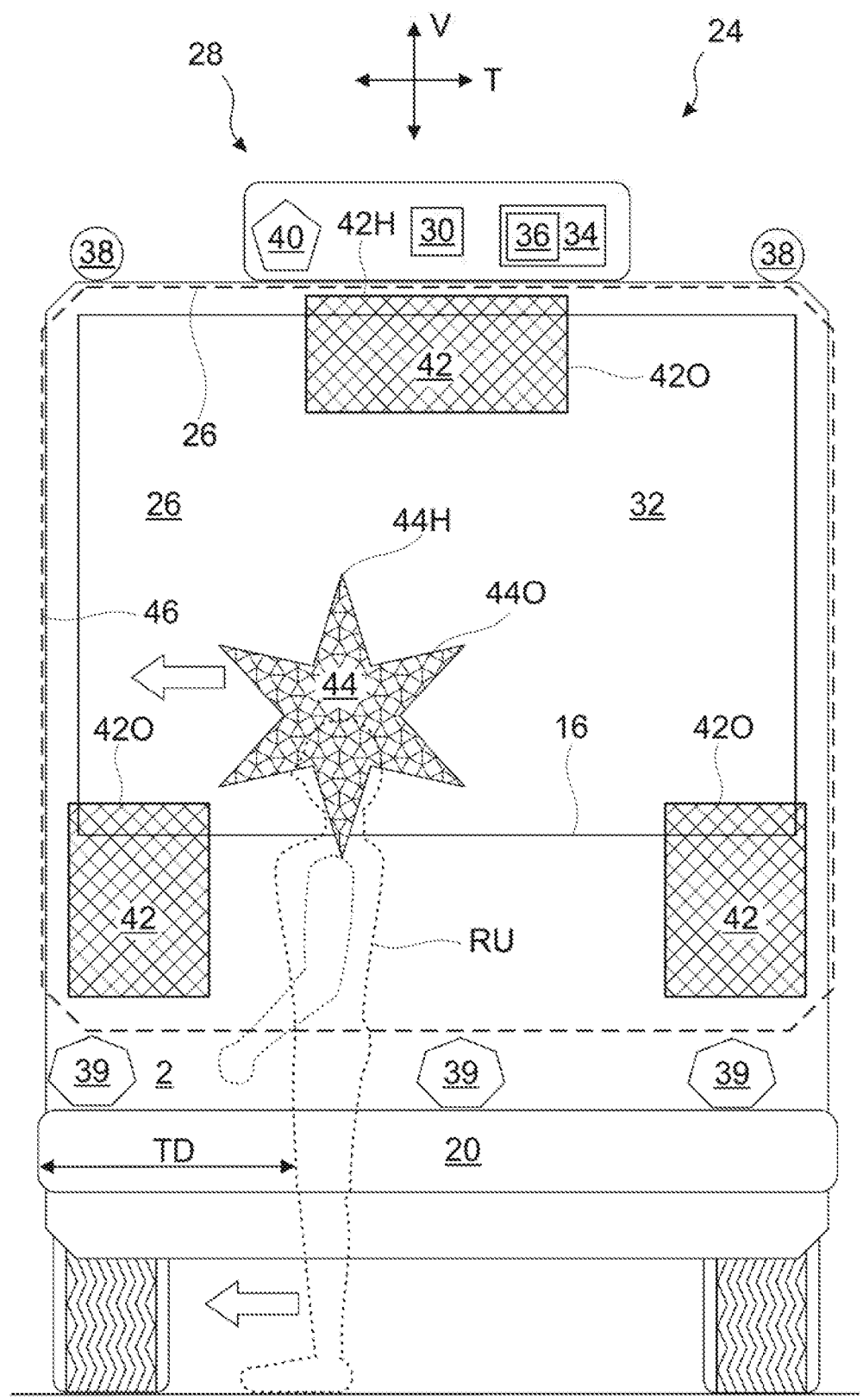
FIG. 2 provides a schematic illustration of a longitudinal view of a vehicle in accordance with a preferred embodiment of the invention.

FIG. 2 shows a longitudinal view of a vehicle 2, for instance a bus, in accordance with a preferred embodiment of the invention. The vehicle 2 may correspond to the one as described in relation with FIG. 1. A road user RU is represented standing in front of a face the vehicle 2, notably the rear face of the vehicle 2. Accordingly, the user may be considered as a rear user. The transversal direction T and the vertical direction V are represented.

The vehicle 2 may comprise a lighting system 24 exhibiting a light emitting surface 26. The light emitting surface 26 may be separate and distinct from the bumper 20. The light emitting surface 26 may have a width of at least 1.5 m, and a height of at least 1 m. The light emitting surface 26 may have a width of at least 2.5 m, and a height of at least 2 m. The light emitting surface may be continuous and/or homogeneous. It may be form of a single display unit. Thus, the electric connection is easier. The integration in the bodywork as well.

The vehicle 2 may further comprise a monitoring device 28 with a position monitoring module 30 configured for monitoring the position of the road user RU if any. The position monitoring module 30 may be adapted for calculating the position of the road user RU with respect to the environment in which the vehicle moves, and/or with respect to the vehicle 2. The position monitoring module may be adapted for calculating the speed of the road user with respect to the environment or the vehicle 2.

The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

At least one matrix 32 may cover a window 16, notably the rear window. Since the windows 16 are transparent, the light emitting surface 26 and notably the matrices 32 may be transparent. For instance, at least one or each matrix 32 may exhibit a transparency of at least 40%. Thus, the lighting system is a transparent lighting system. When arranged on a window, it allows a user to see through the bus, and notably through the windows. Since the second lighting configuration is smaller than the first lighting configuration, it is easier for a user through the bus since the second brightness has a reduces impact on the road user's vision.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30.

Several cameras 38 may provide data to the monitoring device 28. In the current figure, two cameras are represented, however any number of cameras 38 is suitable. In addition, ultrasound sensors 39 may be used. They may provide additional data to the monitoring device 28 in order to detect, and to assess the position of the road user RU.

As an alternative or in addition, communication means 40 may be used in order to obtain data from outer monitoring system providing information on positions of road users RU.

The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26. They may be displayed by different portions thereof. They may be displayed by different surface. By way of illustration, they may be displayed by different number of pixels and/or LEDs. The first luminous picture 42 may be formed by several portions of the light emitting surface 26. The same may apply to the second light emitting picture 44. The first luminous picture 42 and/or the second luminous picture 44 the luminous pictures may comprise a wavelength ranging from 390 nm to 750 nm; values included.

By way of example, the first luminous picture 42 may comprise a breaking luminous signal which is displayed when the vehicle activates its brakes. For instance, the vehicle driver may stop said vehicle 2. The second luminous picture 44 may comprise a warning luminous signal dedicated to the road user RU. It may be a flashing warning luminous signal. The second luminous picture 44 may be centred on the road user RU in order to catch his attention more strikingly. Thus, different levels of safety are provided to the environment, and notably to the road user RU.

As an alternative, the first lighting configuration may comprise a warning signal for all road users in the vehicle environment, and the second lighting configuration may comprise a warning signal close and/or oriented toward the closer road user RU, namely the user in the most dangerous situation.

The vehicle may comprise a vertical separation between the bumper 20 and the light emitting surface 26. Then, protection is provided. As an alternative, the light emitting surface vertically extends from the bumper 20. They are adjacent. Thus, the surface coverage of the vehicle is promoted.

The second lighting configuration, notably the second luminous picture 44, is vertically at distance from the bumper 20. A minimum distance between the second luminous picture 44 and the bumper 22 is greater than the minimum distance between the bumper 20 and the second luminous picture 42. The bumper 20 is closer to the second picture 44 than from the first one. The bumper 20 may be closer to the centre of gravity of the first lighting configuration than from the centre of gravity of the second lighting configuration. The gravity centres may correspond to a combination of luminous pictures.

Accordingly, in case of collision with another vehicle, the lighting system keeps a better capacity to display the second lighting configuration, and notably the second luminous picture. The system is safer and remains operational under unexpected situation.

The first luminous picture 42 and the second luminous picture 44 may have different shapes. They may have different outlines. They may be displayed by different areas of the lighting surface 26. The percentages of the lighting surface 26 displaying them may be different. By way of example, the area of the first luminous picture 42 may be greater than the area of the second luminous picture 44. These areas are computed on the luminous geometric surfaces.

The first luminous picture 42 and the second luminous picture 44 may comprise a first outline 42O and a second outline 44O respectively. These outlines 42O and 44O, or contours, may have different shapes, notably different geometries. The side number may change, angles too. The outlines 42O and 44O may be at distance from one another. The angle and segment densities of the second outline 44O are higher than the corresponding densities of the first outline 42O. The densities may be computed with respect to the surfaces of the pictures. Increasing the densities optimises safety and energy consumption.

The first luminous picture 42, and notably its portions, may be distributed on substantially the whole height and/or the whole width of the lighting surface 26, or at least a majority of the height and/or the majority of the width. The first luminous picture 42 may be transversally larger than the second luminous picture 44. The first luminous picture 42 may be vertically taller than the second luminous picture 44. The highest point 42H of the first luminous picture 42 may be at a higher location than the highest point 44H of the second luminous picture 44. Their summits may be at different heights. The second luminous picture 44 may be between different portions of the first luminous picture 42. Portions of the lighting surface 26 may be switched of, for instance around the second luminous picture 44 and within the first luminous picture 42. Thus, an energy saving is allowed.

The lighting system 24 may be configured for switching from the first lighting configuration to the second lighting configuration depending on the position of the road user RU with respect to the vehicle 2. Here, the position feature may be replaced by the speed feature. For instance, it may be configured for switching when the distance between the road user RU and a corner 46 of the vehicle 2 becomes smaller than a threshold distance TD.

As an option, the lighting system 24 may be configured for selectively displaying the first lighting configuration or the second lighting configuration. As an alternative, the lighting system 24 may be configured for displaying the first lighting configuration or the second lighting configuration, thus the first luminous picture 42 and the second luminous picture 44 together. Then, when the road user RU is too close from the corner 46, it is understood that a hazardous situation or a potentially hazardous situation occurs. Thus, the lighting system 24 reacts and adapts the provided lighting. The lighting system 24 may be configured such that the second luminous picture 44 follows dynamically the road users RU. For instance, when the road user RU walks toward the right side, the second luminous picture 44 may move toward the right corner 46. The second lighting configuration is nearer to the road user RU, but also dedicated. Thus, a second level of safety is provided since the road user RU becomes more aware of dangers. This second level may be higher than the first level associated with the first lighting configuration which is not targeted.

Figure 3:
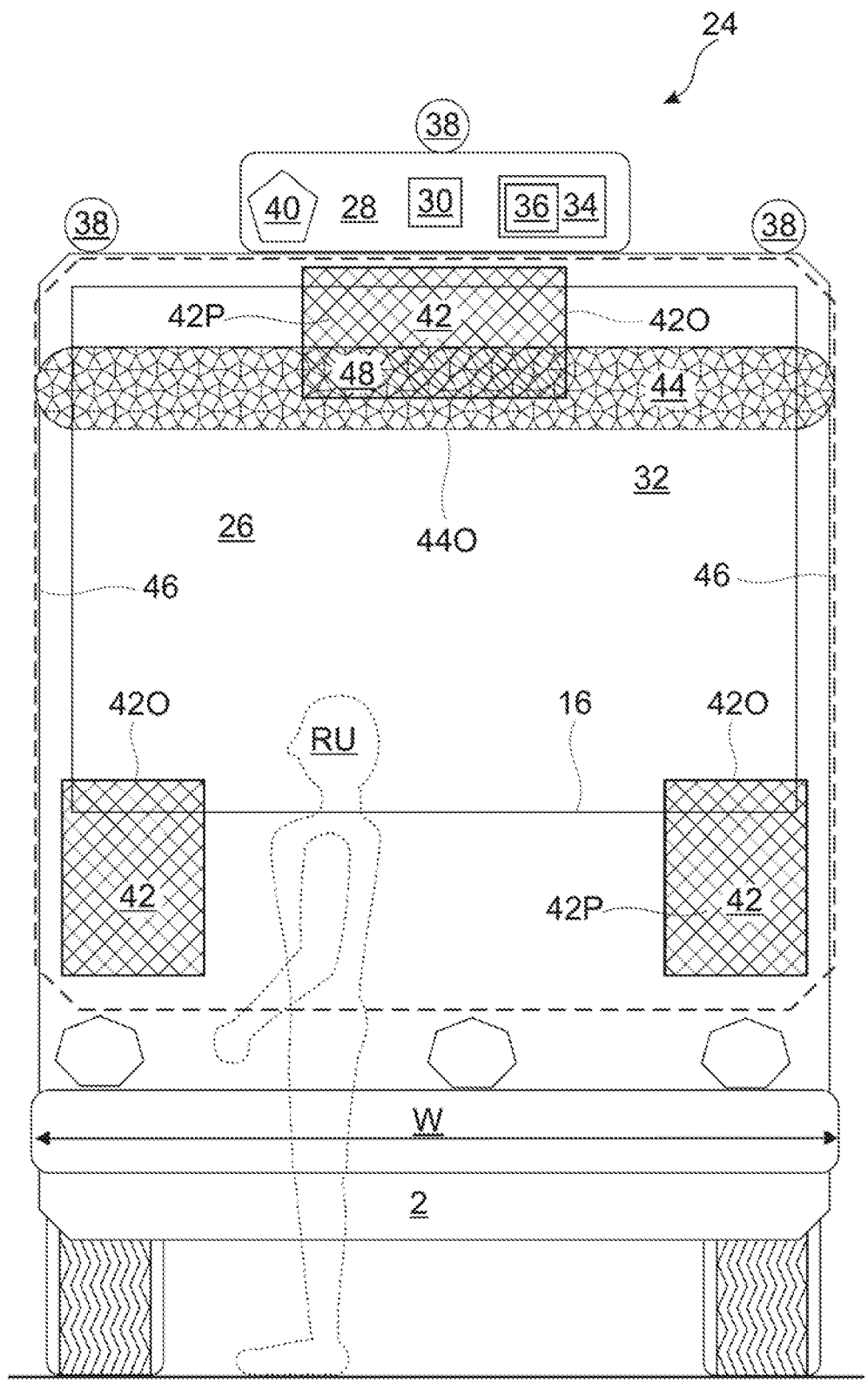
FIG. 3 provides a schematic illustration of a longitudinal view of a vehicle in accordance with a preferred embodiment of the invention.

FIG. 3 shows a longitudinal view of a vehicle 2, for instance of the rear end, in accordance with a preferred embodiment of the invention. The vehicle 2 may correspond to the ones as described in relation with FIG. 1 or 2, and combinations thereof. A road user RU is represented standing behind the vehicle 2.

The vehicle 2 may comprise a lighting system 24 exhibiting a light emitting surface 26. The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user with respect to the environment or the vehicle 2. The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26.

The lighting system 24 may be configured for switching from the first lighting configuration to the second lighting configuration depending on the position of the road user RU with respect to the vehicle 2. Here, the position feature may be replaced by the speed feature. For instance, the lighting system 24 may display the second lighting configuration, and notably the second luminous picture 44, when the road user RU stands or moves along the transversal width of the vehicle 2. Thus, when the road user RU lies in the width of the vehicle, a specific lighting configuration is displayed. When the road user RU is outside the transversal width W of the vehicle, it may be considered that he is able to see the environment in better conditions since blind spots are reduced. Accordingly, the safety of the road user RU is improved, notably when the vehicle 2 is taller than the road user RU.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30. Communication with cameras 38 may be allowed.

As an alternative or in addition, communication means 40 may be used in order to obtain data from outer monitoring system providing information on positions of road users RU.

The first luminous picture 42 and the second luminous picture 44 may comprise a first outline 42O and a second outline 44O respectively. These outlines 42O and 44O may have different shapes, notably different geometries. The second outline 44O may cut the first outline 42O.

The first luminous picture 42 and the second luminous picture 44 may exhibit an overlapping surface 48. In the overlapping surface 48, the luminous pictures 42 and 44 may be displayed by adding their light intensities. The second outline 44O comprises more curves than the first outline 42O. Thus, the curve density of the second outline is the greatest. The overlapping surface is smaller than the second luminous pictures 44, and may span on at most: 80%, or 50% of the second picture 44.

As an alternative, it may be defined that the second lighting configuration has a priority.

The second luminous picture 44 may extend on substantially the whole width of the vehicle 2. It may extend from the left corner 46 to the right corner 46. It may be wider than the first luminous picture 42. The second luminous picture 44 may be vertically thinner than the first luminous picture 42, and notably vertically thinner than each portion 42P of the first luminous picture 42. Then, the energy required for displaying the second luminous configuration may be reduced.

The second luminous picture 44 may touch the first luminous picture 42, notably the upper portion 42P. This raised position increase the safety since it can be perceived by the road user RU and a car arriving from behind.

Figure 4:
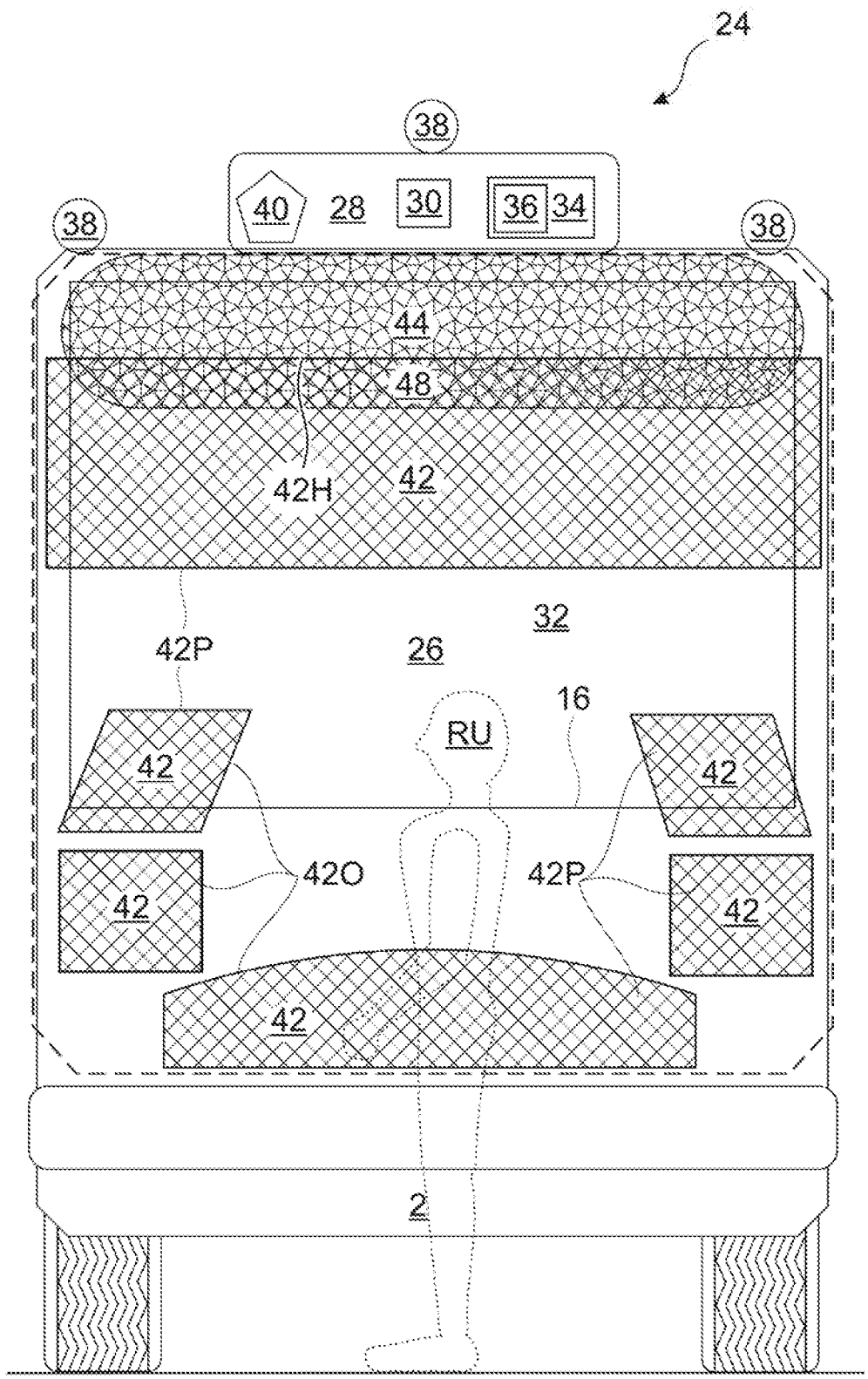
FIG. 4 provides a schematic illustration of a longitudinal view of a vehicle in accordance with a preferred embodiment of the invention.

FIG. 4 shows a longitudinal view of a vehicle 2 in accordance with a preferred embodiment of the invention. The vehicle 2 may correspond to the ones as described in relation with FIGS. 1 to 3, and any combinations thereof. A road user RU is represented standing behind the vehicle 2.

The vehicle 2 may comprise a lighting system 24 exhibiting a light emitting surface 26. The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26. The first luminous picture 42 may comprise several first portions 42P, for instance six first portions 42P. The number of first portions 42P may vary. These first portions 42P may be distributed on the light emitting surface 26. They may have different first outlines 42O. The first outlines 42O may be at distance from each other.

The first luminous picture 42 may extend on the whole width of the vehicle 2, or at least a majority of said width. The first luminous picture 42 may extend vertically on at least a half of the height of the vehicle 2, and notably a majority of the height of the light emitting surface 26. The first luminous picture 42 may extend on the whole height and/or the whole width of the window 16, said window 16 notably being a rear one or a side one. For instance, one of the first portions 42P may extend on the whole width of the window 16.

The second luminous picture 44 may overlap one of the first portions 42P, for instance the upper one. An overlapping surface 48 may form their interface. The overlapping surface 48 may touch the highest point 42H of the first luminous picture 42. Then, the second luminous picture 44 may be above the first luminous picture 42. In case of emergency, the second luminous picture 44 may be seen from a remote location, and notably when there would be a car (not represented) in front of the first luminous picture 42. Then, an improved safety may be provided with a reduced power consumption. The raised position of the second lighting configuration improves the several road users RU with different road using means. The second outline comprises more curves than the first outline.

The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user with respect to the environment or the vehicle 2. The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 may be configured for switching from the first lighting configuration to the second lighting configuration depending on the position of the road user RU with respect to the vehicle 2. Here, the position feature may be replaced by the speed feature.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30. Communication with cameras 38 may be allowed.

As an alternative or in addition, communication means 40 may be used in order to obtain data from outer monitoring system providing information on positions of road users RU.

Figure 5:
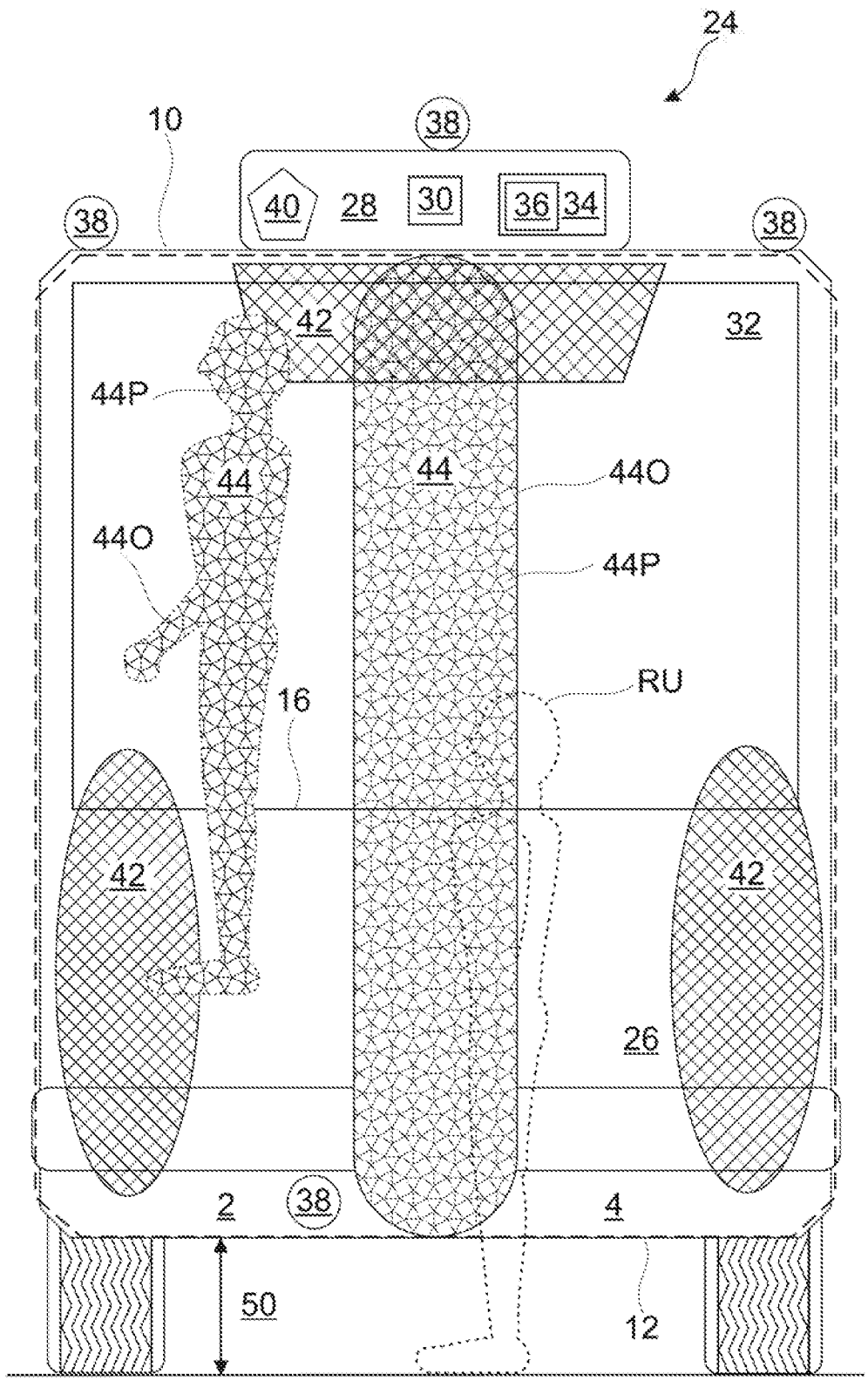
FIG. 5 provides a schematic illustration of a longitudinal view of a vehicle in accordance with a preferred embodiment of the invention.

FIG. 5 shows a longitudinal view of a vehicle 2 in accordance with a preferred embodiment of the invention. The vehicle 2 may correspond to the ones as described in relation with FIGS. 1 to 4, and any combinations thereof. A mad user RU is represented standing behind the vehicle 2.

The vehicle 2 may comprise a lighting system 24 exhibiting a light emitting surface 26. The light emitting surface 26 may have a width of at least 2.5 m, and a height of at least 2.7 m. The light emitting surface 26 may extend on the whole height of the body of unit 4. The light emitting surface 26 may extend from the roof 10 to the passenger platform 12. The bumper is purely optional. The ground clearance 50 may extend up to the lighting system 24.

The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26.

The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user with respect to the environment or the vehicle 2. The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 may be configured for switching from the first lighting configuration to the second lighting configuration depending on the position of the road user RU with respect to the vehicle 2. Here, the position feature may be replaced by the speed feature.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30. Communication with cameras 38 is also considered.

As an alternative or in addition, communication means 40 may be used in order to obtain data from outer monitoring system providing information on positions of road users RU.

The second luminous picture 44 may comprise different second portions 44P. The second portions 44P may comprise different second outlines 44O. These second outlines 44O may be distant from each other. The second outlines 44O may have different shapes.

By way of illustration, the second outline 44O on the right side may form a strip. It may extend on the whole height of the matrix 32, and/or of the light emitting surface 26. Thus, visibility is increased for each road user RU in the environment.

By way of illustration, the second outline 44O of the left second portion 44P may represent the road user RU in front of the vehicle 2, and thus possibly in danger due to other vehicles such as cars or motorbikes. The corresponding second outline 44O may illustrate the road user RU by duplicating its profile. Preferably, the right second portion 44P may be displayed at an upper location than the associated road user RU for safety purposes. Thus, the presence of said road user RU is underlined in a safer way. The size of the right second portion 44P may be larger than the represented road user RU. The second outline defines more angles than the first outline. It exhibits a second geometric feature density which is higher than a first geometric feature density of the first lighting configuration. The geometric feature may comprise curves, angles, segments.

The position of the right second portion 44P may be transversally offset with respect to the true position of the road user RU. Accordingly, third vehicles in the environment may faster identify the presence of the road user RU, whether at a hidden position or by night. Thus, the second lighting configuration is of double interest since it may warn two road users, namely a dangerous one and an endangered one, by providing a warning picture precisely informing that a pedestrian arrives. When the pedestrian is walking, the picture may represent the motion. The picture may be a part of a movie. Thus, the second lighting configuration may comprise a video. A video may be understood as a succession of pictures.

For the purpose of the right second portion 44P, the monitoring device 28, by means of the cameras 38, may include a profile recognition module, for instance associated with the position monitoring module 30. When, a road user RU is identified, his profile is defined in order to communicate an outline signal to the lighting system 24, or at least to the control means thereof. Image recognition means may be used.

As an alternative or in addition, communication means 40 may be used in order to obtain data from outer monitoring system providing information on positions of road users RU.

Figure 6:
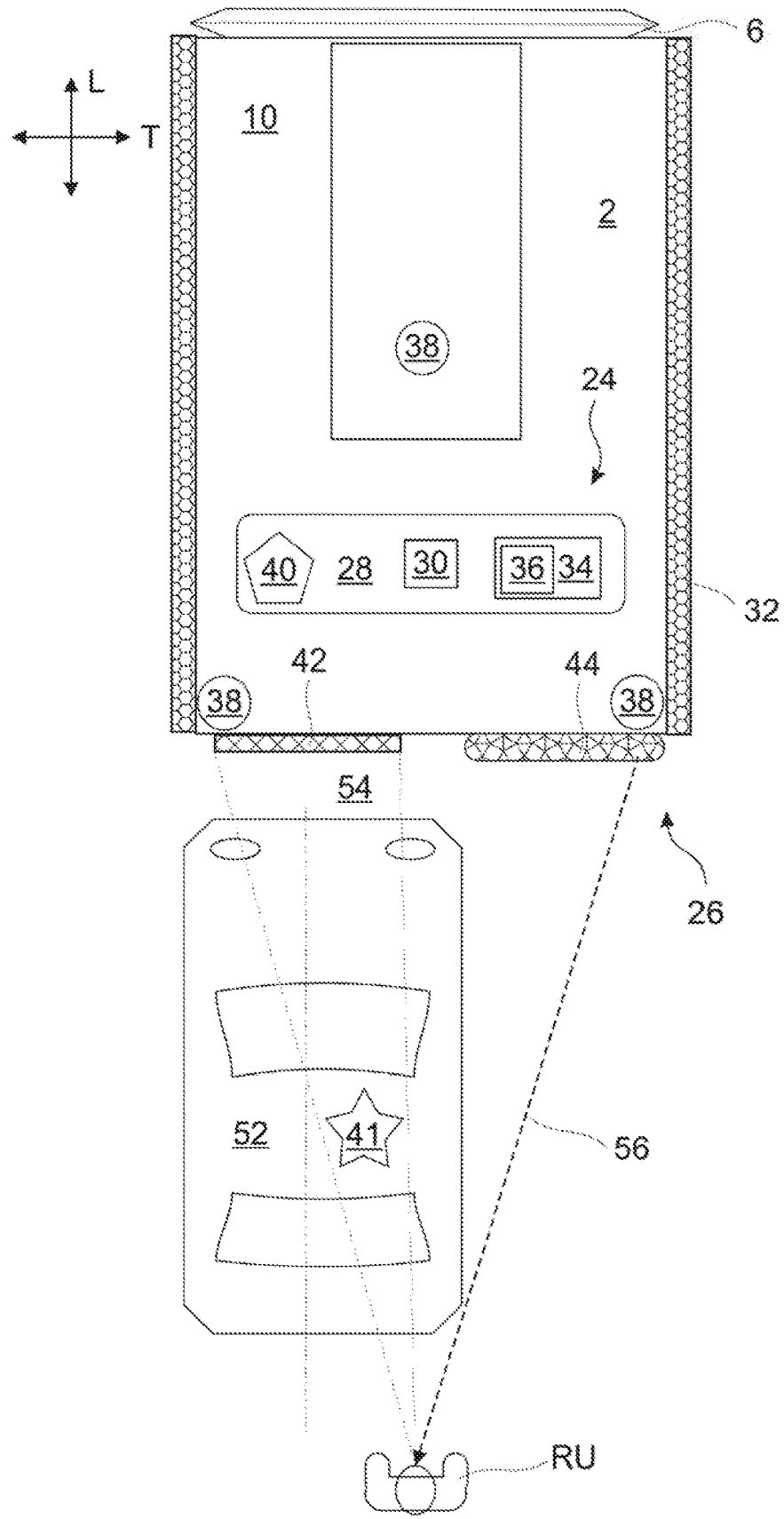
FIG. 6 provides a bird eye view of a vehicle in accordance with a preferred embodiment of the invention.

FIG. 6 shows an aerial view of a vehicle 2 in accordance with a preferred embodiment of the invention. The vehicle 2 may correspond to the ones as described in relation with FIGS. 1 to 5, and any combinations thereof. A road user RU is represented standing behind the vehicle 2. A bellow portion of the joint 6 is apparent. The transversal direction T and the longitudinal direction L are represented.

The vehicle 2 may comprise a lighting system 24 exhibiting a light emitting surface 26. The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26.

The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user with respect to the environment or the vehicle 2. The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 may be configured for switching from the first lighting configuration to the 25 second lighting configuration depending on the position of the road user RU with respect to the vehicle 2. Here, the position feature may be replaced by the speed feature.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30.

The roof 10 may further support cameras 38 communicating, and providing data, to the monitoring device 28. The data may be analysed by the computer 34 in order to adapt the lighting configuration. As an alternative or in addition, communication means 40 may be used in order to obtain data from outer monitoring system providing information on positions of road users RU. Another vehicle such as a car 52 stops between the vehicle 2 and the road user RU. Thus, the car forms a mask preventing the road user RU to be able to observe the whole light emitting surface 26. Because of its height, the car 52 hides the left portion of the light emitting surface 26. Thus, a blind area 54 exists. The monitoring device 28 may be configured for detecting this configuration, and the lighting system 24 adapts the second lighting configuration. The second luminous picture 44 may be, at least partially, at distance from the blind area 54. Here, the lighting system 24 may shift from the first lighting configuration to the second lighting configuration by a left-right slide adaptation. Here, the first luminous picture 42 may slide toward the right side, away from the blind area 54. The second luminous picture 44 may be, at least partially, at distance from the blind area 54.

Thus, a light beam 56 from the second lighting configuration meets the road user RU in order to wan him of dangers. These dangers may be directly identified by the vehicle 2, or by the infrastructures. Further, the danger may be identified by the car 52 which, through its outer monitoring system 41, sends data to the monitoring device 28 of the vehicle 2.

Thus, safety is improved in different fashions. First, the lighting system 24 offers noticeable luminous signals in spite of masks such as the car 52. In addition, the size of the second lighting configuration may be reduced, thereby lowering power consumption. Accordingly, the invention fosters a compromise between the level of safety and the required energy.

Figure 7:
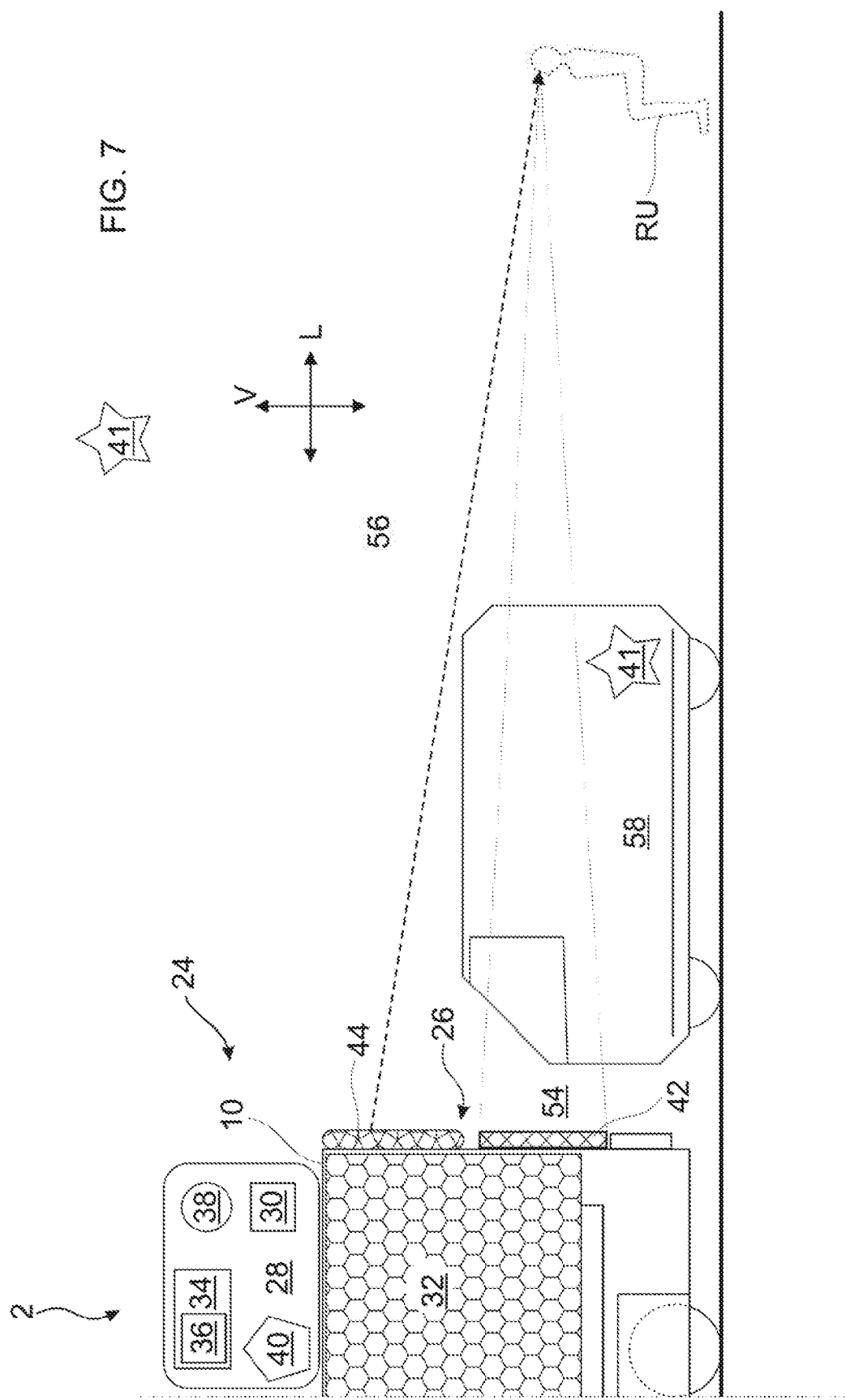
FIG. 7 provides a schematic illustration of a side view of a vehicle in accordance with a preferred embodiment of the invention.

FIG. 7 shows a side view of a vehicle 2 in accordance with a preferred embodiment of the invention. The vehicle 2 may correspond to the ones as described in relation with FIGS. 1 to 6, and any combinations thereof. A road user RU is represented behind the vehicle 2. The longitudinal direction L and the vertical direction V are represented.

The vehicle 2 may comprise a lighting system 24 exhibiting a light emitting surface 26. The lighting system 24 is adapted for displaying a first lighting configuration with a first luminous picture 42; and a second lighting configuration, notably with a second luminous picture 44. The first lighting configuration and the second lighting configuration may be displayed by different percentages, or different proportions, of the light emitting surface 26. The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user RU with respect to the environment or the vehicle 2.

The light emitting surface 26 may be formed by at least one matrix 32 of Light Emitting Diodes (LED). It may form a screen display. At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 may be configured for switching from the first lighting configuration to the second lighting configuration in function of the position of the road user RU with respect to the vehicle 2. Here, the position feature may be replaced by the speed feature. The road user RU may be in another vehicle (not represented). The second lighting configuration may have a higher luminous intensity than the first lighting configuration. Thus, the road user RU is warned by a more efficient signal.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30. As an alternative or in addition to cameras 38, communication means 40 may be used in order to obtain data from outer monitoring systems 41 providing information on positions of road users RU. A monitoring system 41 may be associated with a road infrastructure (not represented).

Another vehicle such as a van 58, or a pickup, stops between the vehicle 2 and the road user RU. Thus, the van 58 creates a mask preventing the road user RU to be able to observe the whole light emitting surface 26. Thus, a blind area 54 reduces the road user RU perception. The blind area 54 may be a space, with a volume. Because of its height, the van 58 hides the lower portion of the light emitting surface 26. The monitoring device 28 may be configured for detecting this blind configuration, and the lighting system 24 adapts the second lighting configuration. Positions of the eyes of the driver of the van 58 may be calculated. As an alternative, a predefined eye position and/or a corresponding field of vision may be considered.

The second luminous picture 44 may be, at least partially, at distance from the blind area 54. It may be above the blind area 54. Here, the lighting system 24 may shift from the first lighting configuration to the second lighting configuration by a vertical relocation. Here, the first luminous picture 42 may slide upward. The monitoring device 28 may estimate or compute the distance between the vehicle 2 and the van 58 an/or the road user RU.

At least one, or several cameras 38 (only one represented) may be provided. These cameras 38 may provide data to the monitoring device 28 in order to analyse the position of the road user RU, and to assess which portion of the light emitting surface 26 can be seen by the road user RU whereas the van 58 forms a mask. The cameras 38 may be in elevation with respect to the van 58. The roof 10 of the vehicle 2 supporting the cameras 38 may be higher than the van top. Thus, road users RU which are smaller than the van 58 may be detected.

A light beam 56 from the second lighting configuration meets the road user RU in order to warn him on dangers to which he is exposed. These dangers may be directly identified by the vehicle 2, or by the infrastructures. Further, the danger may be identified by the van 58 which, through its monitoring system 41, emits data to the monitoring device 28 of the vehicle 2. An Thus, safety is improved. First, the lighting system 24 displays a targeted luminous signal in spite of masks such as the van 58. In addition, the size of the second lighting configuration may be reduced, thereby providing energy savings. Accordingly, the invention fosters a compromise between the level of safety and the required energy. The current configuration may notably be combined with the teaching of FIG. 3.

Figure 8:
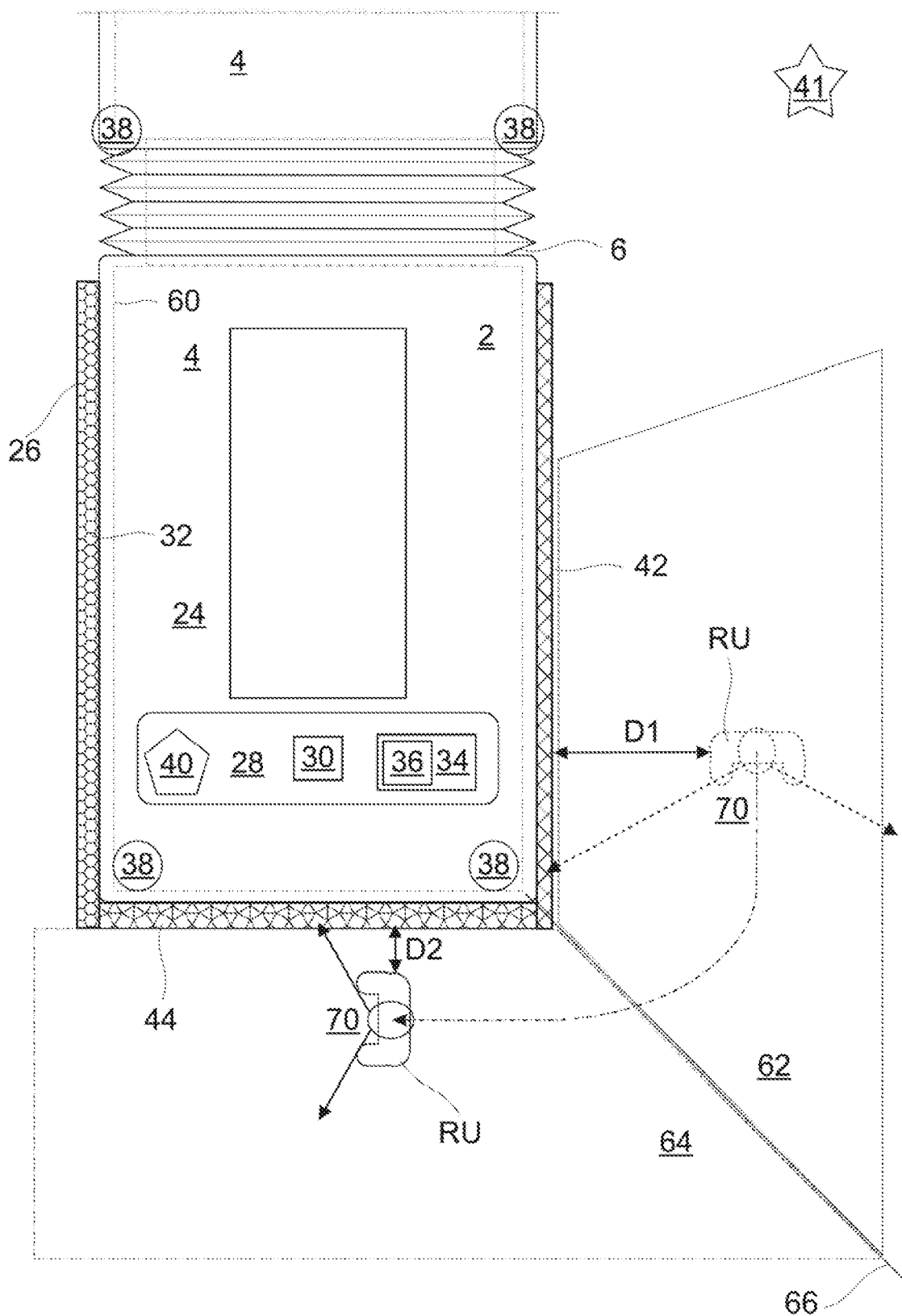
FIG. 8 provides a bird eye view of a vehicle in accordance with a preferred embodiment of the invention.

FIG. 8 shows an aerial view of a vehicle 2 in accordance with a preferred embodiment of the invention. The vehicle 2 may correspond to the ones as described in relation with FIGS. 1 to 7, and any combinations thereof.

A road user RU is represented at two positions: at a first position with dotted lines, and at a second position with a solid line. At the first position, the road user RU is along a side face of the vehicle 2, and at the second position the road user RU stands in front of the rear face of the vehicle 2. More generally, in the first position, the road user RU is in a first area 62, notably a side area; and in the second position the road user RU is in a second area 64, notably a rear area. The areas 62 and 64 may be separated by an interface 66. The areas 62 and 64 may be predefined with respect to, and in relation with the vehicle 2. The interface 66 may be a virtual fence. It may be a virtual planar surface.

The vehicle 2 may comprise a lighting system 24 exhibiting a light emitting surface 26. The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26. A remaining percentage may remain switched off. The vehicle 2 may be an articulated vehicle 2. A joint 6 between units 4 of the articulated vehicle 2 is represented. The articulated vehicle 2 may comprise a passenger compartment 60. The passenger compartment 60 may extend in each unit 4, and through the joint 6. The light emitting surface 26 may extend transversally on the majority of the transversal width of the vehicle 2, and/or of the passenger compartment 60.

The vehicle 2 may further comprise a monitoring device 28 with a position monitoring module 30 configured for monitoring the position of the road user RU. The position monitoring module 30 may be adapted for calculating the position of the road user RU with respect to the environment in which the vehicle moves, and/or with respect to the vehicle 2. The position monitoring module 30 may be adapted for calculating the speed of the road user RU with respect to the environment and/or the vehicle 2.

The light emitting surface 26 may be formed by at least one matrix 32 of Light Emitting Diodes (LED). At least one matrix 32 may form a screen display. The diodes (not represented) forming at least one matrix 32 may exhibit a pitch of about 20 mm. A pitch may correspond to the size of the polygons delimited by the diodes. It may be understood that the diodes form a meshing with square meshes of about 20 mm. Triangular meshes or other shapes are considered as well.

The lighting system 24 may be configured for switching from the first lighting configuration to the second lighting configuration depending on the position of the road user RU with respect to the vehicle 2. Here, the position feature may be replaced by the speed feature.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30. Communication with cameras 38 may be allowed. As an alternative or in addition, communication means 40 may be used in order to obtain data from monitoring system providing information on positions of road users RU.

The lighting system 24 may be configured for switching from the first lighting configuration to the second lighting configuration when the position monitoring module 30 detects that the road user RU moves from the first area 62 to the second area 64. Switching may occur when the interface 66 is crossed by the road user RU, a mixed line crossing the interface 66 illustrates the trajectory of the road user RU.

When the road user RU is along the side face of the vehicle 2, the right-side portion of the light emitting surface 26 is selectively illuminated in order to display the first lighting configuration. When the road user RU is along the rear face (or front side) of the vehicle 2, the rear side (respectively the front side) of the light emitting surface 26 is selectively illuminated in order to display the second lighting configuration.

At the first position, the road user RU is at a first distance D1 from the light emitting surface 26, and notably of the first luminous picture 42. At the second position, the road user RU is at a second distance D2 from the light emitting surface 26, and notably of the second luminous picture 44. The distances D1 and D2 may be measured perpendicularly to the light emitting surface 26, at the nearest point thereon.

As an alternative, the first distance D1 and the second distance D2 may be measured when the road user RU is in a same area 62 or 64.

The distance D2 may be smaller than the distance D1. Thus, the light emitting surface 26 is selectively used. Several portions are powered one after the other in order to limit power consumption, and to use portions close to the road user RU, or at least in the visual field 70 of the road user RU. As an alternative, power consumption may remain constant but concentrate on a smaller surface in order to display a more striking signal. Further, since the second distance D2 is smaller than the first distance D1, the second luminous picture 44 may be smaller than the first luminous picture 42. A smaller illuminated area may be required for the second luminous picture 44.

In the current figure, the first luminous picture 42 and the second luminous picture 44 are represented as continuous pictures. However, they could be discontinuous as represented in relation with FIGS. 2 to 5. The size of the luminous portions forming the pictures 42 and 44 may be reduced in order to reduce the consumed power.

Figure 9:
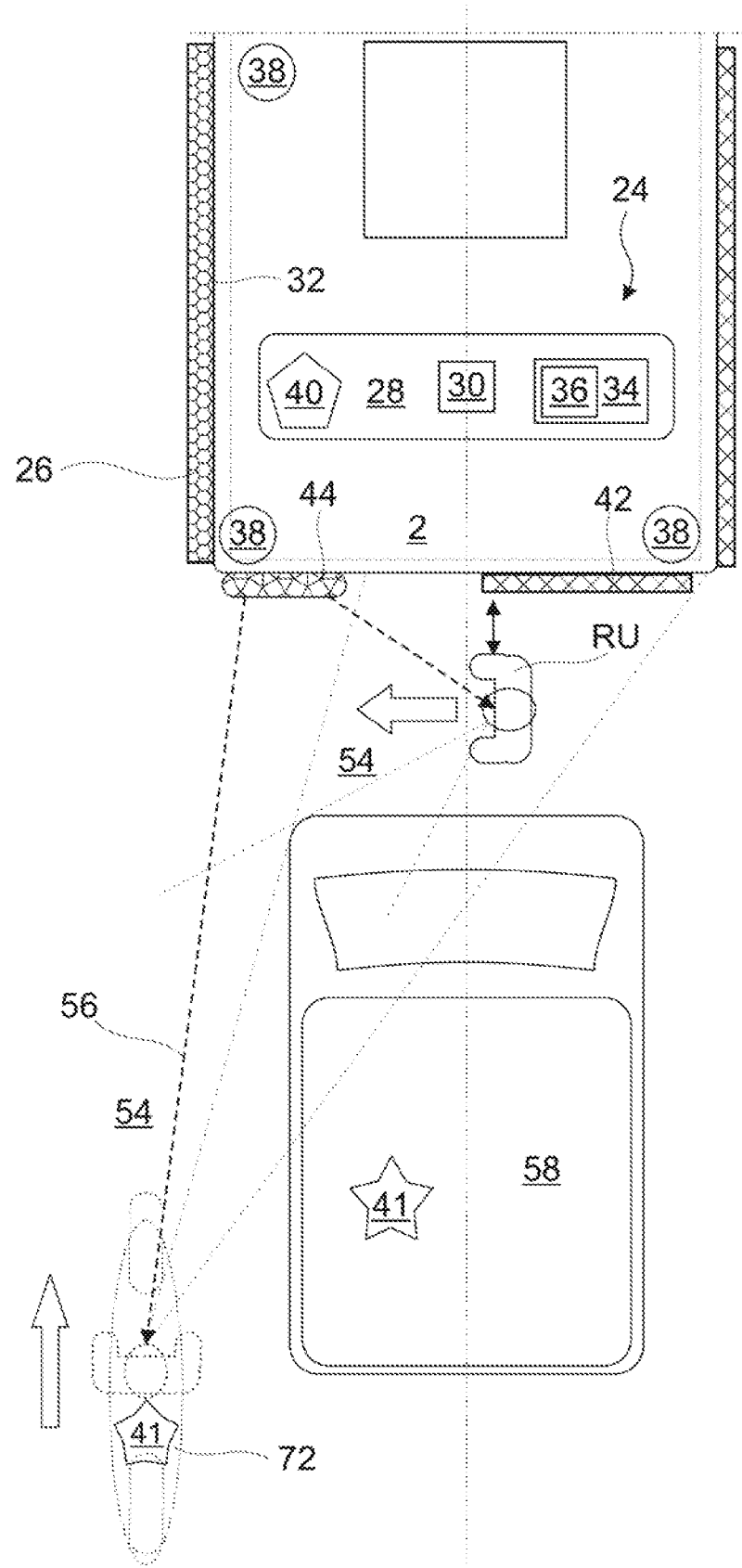
FIG. 9 provides a bird eye view of a vehicle in accordance with a preferred embodiment of the invention.

FIG. 9 shows an aerial view of a vehicle 2 in accordance with a preferred embodiment of the invention. The vehicle 2 may correspond to the ones as described in relation with FIGS. 1 to 8, and any combinations thereof. A road user RU, for instance a pedestrian, is represented standing behind the vehicle 2. A second vehicle such as a van 58 is between the road user RU and a third vehicle such as a motorbike 72. The vehicle 2 and the van 58 may stop, whereas the road user RU and the motorbike may be moving toward each other. Thus, a four-actor dangerous configuration is provided.

The vehicle 2 may comprise a lighting system 24 exhibiting a light emitting surface 26. The lighting system 24 is adapted for displaying a first lighting configuration with a first luminous picture 42; and a second lighting configuration, notably with a second luminous picture 44. The first lighting configuration and the second lighting configuration may be displayed by different percentages of the light emitting surface 26.

The vehicle 2 may further comprise a monitoring device 28 with a position monitoring module 30 configured for monitoring the position of the road user RU. The position monitoring module 30 may be adapted for calculating the position of the road user RU with respect to the environment in which the bus moves, and/or with respect to the bus 2. The position monitoring module 30 may be adapted for calculating the speed of the road user with respect to the environment or the vehicle 2. The light emitting surface 26 may be formed by at least one matrix 32 of Light Emitting Diodes (LED). At least one matrix 32 may form a screen display. The diodes (not represented) forming at least one matrix 32 may have a pitch of about 20 mm. It may be understood that the diodes form a meshing with square meshes of about 20 mm. Triangular meshes or other shapes are considered as well.

The lighting system 24 may be configured for switching from the first lighting configuration to the second lighting configuration depending on the position of the road user RU with respect to the vehicle 2. Here, the position feature may be replaced by the speed feature.

The vehicle 2 may comprise a computer 34 with a computer readable medium 36 and a processing unit (not represented). The computer readable medium 36 may support a source code for carrying out a monitoring process, notably in accordance with the invention. The computer 34 may be connected to the lighting system 24 in order to allow a communication with the monitoring device 28, and notably with the position monitoring module 30.

As an alternative or in addition, communication means 40 may be used in order to obtain data from outer monitoring system providing information on positions of road users RU.

The van 58 creates a mask preventing the road user RU to be observe the whole road environment. The road user RU may have a tunnel vision. This van 58 further forms a mask for the motorbike 72. Consequently, a blind area 54 reduces the motorbike field of perception. Because of its height, the van 58 hides the lower half of the light emitting surface 26, and notably the right half. The monitoring device 28 may be configured for detecting this double-blind configuration, and the lighting system 24 provides a dedicated second lighting configuration. The second luminous picture 44 may be, at least partially, at distance from the blind area 54. It may be above the blind area 54, and/or transversally shifted toward the left side for the purpose of the current situation. Here, the lighting system 24 may shift from the first lighting configuration to the second lighting configuration by a vertical motion and/or a transversal motion.

Thus, light beams 56 from the second lighting configuration meets the road user RU and the motorbike 72 in order to warn them on the dangers they represent for each other.

These dangers may be directly identified by the vehicle 2, or by infrastructures. Further, the dangers may be identified by the van 58 and/or the motorbike 72 which, through their respective monitoring systems 41, emit data to the monitoring device 28 of the vehicle 2.

Consequently, safety is improved. First, the lighting system 24 displays a targeted luminous signal in spite of masks such as the van 58. In addition, the size of the second lighting configuration may be reduced, thereby driving to energy savings. Accordingly, the invention fosters a compromise between the level of safety and the required energy.

The current configuration may notably be combined with the teaching of FIG. 5 in order to display a pedestrian shape at the attention of the motorbike 72.

A motorbike 72 is mentioned by way of example, however the invention may address any other third vehicle. The current description refers to a motorbike 72, however this term may also designate the motorbike driver, which as a matter of facts is a road user.

The above description detailed with respect to a bus 2 may generally apply to a vehicle, such as a road vehicle or a vessel. As a general aspect of the invention, the positions of the elements 28-40 may be purely illustrative. These elements 28-40 may each be disposed at other locations. They may form other groups, and may be associated otherwise.

The invention provides a preferred embodiment of the invention wherein of all features defined in relation with FIGS. 1 to 9 are combined together.

Figure 10:
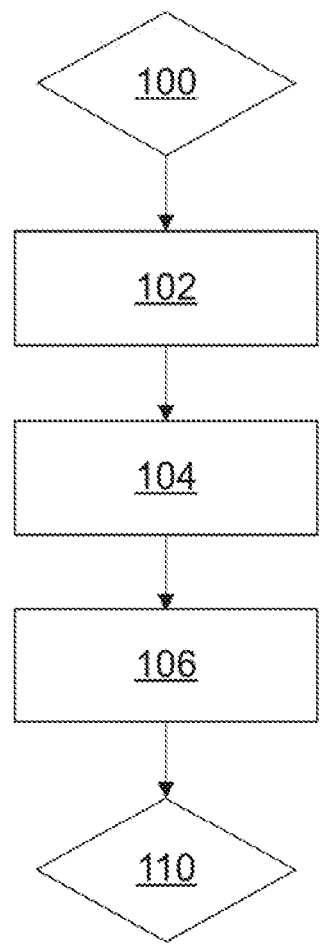
FIG. 10 provides a diagram block of a monitoring process in accordance with a preferred embodiment of the invention.

FIG. 10 provides a schematic illustration of a monitoring process for a vehicle such as a bus. The vehicle may correspond to any one of those as described in relation with FIGS. 1 to 9, and any combinations thereof.

The monitoring process may comprise the steps:
displaying 100 the first lighting configuration with a first proportion or first percentage of the light emitting surface,
monitoring 102 the vehicle environment in order to detect a road user, notably a pedestrian or a driver, and in order to determine the position of said road user with respect to the vehicle,
detecting 104 a position change of the road user, notably in front of the lighting system, and/or identifying 106 a mask such as a car, between said vehicle and the road user,
then
displaying 110 the second lighting configuration with a second proportion or a second percentage of the light emitting surface.

Step monitoring 102 and step detecting 104 may be carried out simultaneously. They may be carried out during step displaying 100 the first lighting configuration.

During step detecting 102, a communication module of the lighting system may be adapted for communication with the vehicle environment, notably with a road infrastructure and/or at least another vehicle. The monitoring process may start step displaying 110 the second lighting configuration upon reception of data received from the environment.

During step displaying 110 the second proportion may be different from the first proportion.

The monitoring process may start step displaying 110 the second lighting configuration after step identifying 106 a mask between said vehicle and the road user, said second lighting configuration comprising an offset portion with respect to the mask.

The monitoring process in accordance with the invention detects a road user, and adapts the lighting configuration to the position of the road user.

It should be understood that the detailed description of specific preferred embodiments is given by way of illustration only, since various changes and modifications within the scope of the invention will be apparent to the person skilled in the art. The scope of protection is defined by the following set of claims.

The invention claimed is:
1. A vehicle comprising:
a transparent window;
a lighting system including a light emitting surface, said lighting system being configured for displaying a first lighting configuration and a second lighting configuration to an outside of the vehicle, the second lighting configuration being displayed by a proportion of said light emitting surface; and
a position monitoring module configured for monitoring a position of a road user with respect to said vehicle, wherein the lighting system is further configured for switching from the first lighting configuration to the second lighting configuration depending on the position of said road user with respect to the vehicle, wherein the lighting system covers said transparent window and comprises a matrix of light emitting diodes which is configured for displaying the first lighting configuration and the second lighting configuration, said matrix of light emitting diodes defining a transparency comprised between 40% and 90%.

2. The vehicle in accordance with claim 1, wherein the lighting system is further configured for switching from the first lighting configuration to the second lighting configuration when the position monitoring module detects that the road user moves from a first predefined area to a second predefined area, the first predefined area being adjacent to a first face of the vehicle, and the second predefined area being adjacent to a second face of the vehicle.

3. The vehicle in accordance with claim 1, wherein the first lighting configuration comprises a first luminous picture, and the second lighting configuration comprises a second luminous picture, wherein the first luminous picture is vertically taller and horizontally larger than the second luminous picture, and wherein an area of the second luminous picture being smaller than an area of the first luminous picture.

4. The vehicle in accordance with claim 3, wherein the first lighting configuration comprises a first highest point, and the second lighting configuration comprises a second highest point which is lower than the first highest point.

5. The vehicle in accordance with claim 3, wherein each of the first lighting configuration and the second lighting configuration extends on a majority of a vehicle width, and wherein the first luminous picture overlaps at least partially the second luminous picture, and the first luminous picture and the second luminous picture comprise an overlapping area which is smaller than the second luminous picture.

6. The vehicle in accordance with claim 1, wherein the first lighting configuration comprises a first outline and the second lighting configuration comprises a second outline with a different shape than the first outline, the second outline comprising a higher geometric feature density than the first outline.

7. The vehicle in accordance with claim 1, wherein the lighting system is further configured such that when the road user is at a first distance from the vehicle, the lighting system displays the first lighting configuration with a first portion of the light emitting surface; and when said road user is at a second distance from the vehicle, the lighting system displays the second lighting configuration with a second portion of said light emitting surface, the first distance being longer than the second distance, and the second portion being smaller than the first portion.

8. The vehicle in accordance with claim 1, wherein the vehicle comprises a bumper below the light emitting surface, the lighting system being vertically at a distance from said bumper, wherein the bumper and the light emitting surface are vertical separated from one another, and wherein the bumper and the light emitting surface are longitudinally offset from one another.

9. The vehicle in accordance with claim 1, wherein the vehicle comprises a rear face and a side face, the lighting system extending on the rear face and on the side face, and wherein the lighting system is further configured such that the first lighting configuration is displayed from the side face and the second lighting configuration is displayed from the rear face.

10. The vehicle in accordance with claim 1, further comprising a monitoring device that includes a module for identifying a mask between said vehicle and the road user, the monitoring device being configured for starting displaying the second lighting configuration upon detection of said mask between said vehicle and the road user, said second lighting configuration comprising an offset portion with respect to the mask.

11. The vehicle in accordance with claim 1, wherein the first lighting configuration comprises a first level of safety for the road user, and the second lighting configuration comprises a second level of safety for the road user, said second level being higher than the first level; the second level comprising at least one of the following: a frequency increase, a middle point elevation, and a light intensity increase with respect to the first level of safety.

12. The vehicle in accordance with claim 1, wherein the first lighting configuration comprises a first highest point and a first level of safety for the road user, and the second lighting configuration comprises a second highest point and a second level of safety for the road user; said second level being higher than the first level and the second highest point is below the first highest point.

13. The vehicle in accordance with claim 1, wherein the vehicle comprises a rear face, the road user is a rear user facing said rear face, the light emitting surface being a rear light emitting surface, the second lighting configuration being displayed by a rear proportion of said rear light emitting surface, the lighting system being further configured for switching from the first lighting configuration to the second lighting configuration depending on the position of said road user with respect to said rear light emitting surface.

14. A bus comprising:
a window;
a lighting system including a light emitting surface, said lighting system being configured for displaying a first lighting configuration with at least a first proportion of the light emitting surface and a second lighting configuration with a second proportion of the light emitting surface to an outside of the bus, wherein the lighting system is a transparent lighting system which defines a transparency of at least 40% and which covers said window; the lighting system being configured for displaying the first lighting configuration with at least the first proportion of the light emitting surface and for displaying the second lighting configuration with the second proportion of the light emitting surface, said first proportion being greater than the second proportion; and
a position monitoring module configured for monitoring the position of a road user with respect to said bus, wherein the lighting system is further configured such that when the road user is at a first distance from the bus, the lighting system displays the first lighting configuration; and when said road user is at a second distance from the bus, the lighting system displays the second lighting configuration with the second proportion which is smaller than the first proportion.

15. The bus in accordance with claim 14, wherein the first lighting configuration comprises a first luminous picture, and the second lighting configuration comprises a second luminous picture, wherein the first luminous picture is vertically taller and horizontally larger than the second luminous picture, the first luminous pictures comprises a first area and the second luminous picture comprises a second area which is smaller than the first area.

16. A vehicle omprising:
a transparent window;
a lighting system including a light emitting surface, said lighting system being configured for displaying a first lighting configuration and a second lighting configuration to an outside of the vehicle, the second lighting configuration being displayed by a proportion of said light emitting surface, wherein the lighting system covers said transparent window and comprises a matrix of light emitting diodes which is configured for displaying the first lighting configuration and the second lighting configuration said matrix of light emitting diodes defining a transparency comprised between 40% and 90%; and
a position monitoring module configured for monitoring the position of a road user with respect to said vehicle, wherein the first lighting configuration comprises a first level of safety for the road user, and the second lighting configuration comprises a second level of safety for the road user, said second level being higher than the first level, and wherein the lighting system is further configured for switching from the first lighting configuration to the second lighting configuration depending on the position of said road user with respect to the vehicle.

17. The vehicle in accordance with claim 16, wherein the second level of safety level comprises a middle point elevation.

18. The vehicle in accordance with claim 16, wherein the second level of safety level comprising at least one of a group consisting of: a frequency increase, a light intensity increase, and combination thereof.

* * * * *